United States Patent
Wei et al.

(10) Patent No.: US 10,540,918 B2
(45) Date of Patent: Jan. 21, 2020

(54) MULTI-WINDOW SMART CONTENT RENDERING AND OPTIMIZING METHOD AND PROJECTION METHOD BASED ON CAVE SYSTEM

(71) Applicant: Hangzhou YiYuQianXiang Technology Co., Ltd., Hangzhou (CN)

(72) Inventors: Pingting Wei, Hangzhou (CN); Ruizi Qin, Hangzhou (CN)

(73) Assignee: HANGZHOU YIYUQIANXIANG TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 15/979,399

(22) Filed: May 14, 2018

(65) Prior Publication Data
US 2018/0330648 A1 Nov. 15, 2018

(30) Foreign Application Priority Data
May 12, 2017 (CN) .......................... 2017 1 0336178

(51) Int. Cl.
*G09G 3/00* (2006.01)
*G06F 3/14* (2006.01)
*G06F 3/01* (2006.01)
*G06F 3/0481* (2013.01)
*G06F 3/0484* (2013.01)

(52) U.S. Cl.
CPC .............. *G09G 3/003* (2013.01); *G06F 3/011* (2013.01); *G06F 3/012* (2013.01); *G06F 3/0481* (2013.01); *G06F 3/04815* (2013.01); *G06F 3/1423* (2013.01); *G09G 3/002* (2013.01); *G06F 3/0484* (2013.01); *G09G 2320/028* (2013.01); *G09G 2340/0407* (2013.01); *G09G 2354/00* (2013.01)

(58) Field of Classification Search
None
See application file for complete search history.

(56) References Cited

U.S. PATENT DOCUMENTS

2018/0330698 A1* 11/2018 Wei .......................... G09G 5/38
2019/0051051 A1* 2/2019 Kaufman ............... G01C 21/32

OTHER PUBLICATIONS

Lugrin, Jean-Luc, et al. "Innnnersive FPS games: user experience and performance." Proceedings of the 2013 ACM international workshop on Immersive media experiences. ACM, 2013.*
Lugrin, Jean-Luc, et al. "CaveUDK: a VR game engine middleware." Proceedings of the 18th ACM symposium on Virtual reality software and technology. ACM, 2012.*

(Continued)

*Primary Examiner* — Ryan M Gray
(74) *Attorney, Agent, or Firm* — Gokalp Bayramoglu

(57) ABSTRACT

This invention provides a rendering and optimizing method and a projection method based on a CAVE system. The rendering and optimizing method includes: acquiring first visual coordinate information of a user relative to each visual plane; generating a projection channel of the user relative to each visual plane based on the first visual coordinate information; selecting a projected object in the projection channel according to a history or visual preference information instantly input by the user; and rendering a pipeline based on the projected object in the projection channel and reading a projection result. This invention can provide personalized rendering options for users in the CAVE system.

13 Claims, 8 Drawing Sheets

(56) References Cited

OTHER PUBLICATIONS

Xu, Shuhong, et al. "Tennis space: an interactive and immersive environment for tennis simulation." 2009 Fifth International Conference on Image and Graphics. IEEE, 2009.*

Chang, Benjamin, and Marc Destefano. "Game engines and immersive displays." The Engineering Reality of Virtual Reality 2014. vol. 9012. International Society for Optics and Photonics, 2014.*

Neto, Mário Popolin, et al. "Unity cluster package—dragging and dropping components for multi-projection virtual reality applications based on PC clusters." International Conference on Computational Science and Its Applications. Springer, Cham, 2015.*

Nan, Xiaoming, et al. "vDesign: a CAVE-based virtual design environment using hand interactions." Journal on Multimodal User Interfaces 8.4 (2014): 367-379.*

Papadopoulos, Charilaos, et al. "The Reality Deck—an immersive gigapixel display." IEEE computer graphics and applications 35.1 (2014): 33-45.*

Petkov, Kaloian, Charilaos Papadopoulos, and Arie E. Kaufman. "Visual exploration of the infinite canvas." 2013 IEEE Virtual Reality (VR). IEEE, 2013.*

* cited by examiner

Focus field

Unfocus field

MULTI-WINDOW SMART CONTENT RENDERING AND OPTIMIZING METHOD AND PROJECTION METHOD BASED ON CAVE SYSTEM

CROSS REFERENCE TO RELATED APPLICATIONS

This Non-provisional application claims priority under 35 U.S.C. § 119(a) from Chinese Patent Application No(s). 201710336178.7 filed on May 12, 2017, the entire contents of which are hereby incorporated by reference.

TECHNICAL FIELD

The present invention relates to the field of image processing technologies, and in particular, to a multi-window smart content rendering and optimization method based on a cave automatic virtual environment (CAVE) system and a multi-window smart content projection method based on the CAVE system.

BACKGROUND

A cave automatic virtual environment (CAVE) projection system is a large virtual reality (VR) system, with high degrees of immersion and interactivity. The CAVE projection system can fuse vision, touch, sound and other senses, and can track head movement head movement along 6 degrees of freedom. The principles of a CAVE immersive virtual reality display system are relatively complex. It is based on computer graphics and perfectly integrates high-resolution stereoprojection display technology, multi-channel vision synchronization technology, 3D computer graphics technology, audio technology, and sensor technology; to create a fully immersive virtual environment surrounded by 3D stereoprojection for multiplayer. At present, the real-time high-resolution multi-window content rendering of complex scenes is mainly applied to the CAVE system.

The CAVE projection system is a large VR system with high degree of immersion and interactivity. The CAVE projection system is a highly immersive virtual demonstration environment composed three or more (i.e. including three) hard rear-projection walls. An observer is surrounded by the virtual reality system with a plurality of images, and a plurality of projection surfaces form a virtual space. The common CAVE system projection space is a standard cubic structure, and the four independent projection channels finally form a space continuous projection image.

In the prior art, a common CAVE system needs to render all the scenes and cannot be personalized according to user requirements, resulting in a waste of data resources and low processing efficiency of computer. In addition, all-scenario renderings increase unnecessary computational resource overhead and can even affect the consistency of observation to a certain extent in large-scale and complex scenes. In the prior art there are also occlusions between the scene contents when complex scenes are displayed, the user needs to distinguish in observation, which will cause a large waste of manpower and material resources.

SUMMARY

The technical problem solved by the technical solution of the present invention is how to provide personalized rendering options for users in a cave automatic virtual environment (CAVE) system.

In order to solve the above technical problem, the technical solution of the present invention provides a multi-window smart content rendering and optimizing method based on the CAVE system, and the CAVE system comprises: a visual platform including a plurality of visual planes, comprising:
acquiring first visual coordinate information of a user relative to each visual plane;
generating a projection channel of the user relative to each visual plane based on the first visual coordinate information;
selecting a projected object in the projection channel according to a history or visual preference information instantly input by the user; and
rendering a pipeline based on the projected object in the projection channel and reading a projection result.

Optionally, the multi-window smart content rendering optimizing method may further comprise: acquiring second visual coordinate information of the user relative to the visual platform; and determining the resolution of each visual plane based on the second visual coordinate information;
wherein rendering the pipeline based on the projected object in the projection channel and reading the projection result comprises:
performing primitive assembly based on the projected object in the projection channel to generate an object to be rendered; and
generating a rendering result according to the resolution of the corresponding visual plane of each projection channel and the object to be rendered.

Optionally, the first visual coordinate information may comprise a near clip plane distance and a far clip plane distance from the user's viewpoint to each visual plane.

Optionally, the projection channel $S_f$ of the user relative to the visual plane f is obtained based on the following formula:

$$S_f = \begin{pmatrix} \dfrac{2N}{\text{right} - \text{left}} & 0 & \dfrac{\text{right} + \text{left}}{\text{right} - \text{left}} & 0 \\ 0 & \dfrac{2N}{\text{top} - \text{bottom}} & \dfrac{\text{top} + \text{bottom}}{\text{top} - \text{bottom}} & 0 \\ 0 & 0 & -\dfrac{F + N}{F - N} & \dfrac{-2FN}{F - N} \\ 0 & 0 & -1 & 0 \end{pmatrix}$$

Wherein N is the distance from the user's viewpoint to a near clip plane of the visual plane f, F is a distance from the user's viewpoint to a far clip plane of the visual plane f, right, left, top and bottom respectively represent the lengths of four sides of the visual plane f, and f is a natural number greater than one.

Optionally, the visual preference information may comprise projected object markup information, wherein the markup information comprises at least one of the following information:
first markup information of an interested projected object; and
second markup information of a non-interested projected object.

Optionally, selecting the projected object in the projection channel according to the history or the visual preference information instantly input by the user may comprise at least one of the following steps:

forming the object to be rendered by selecting the projected object in the projection channel according to visual preference information historically input by the user;
forming an rendering object by removing the projected object in the projection channel according to the visual preference information historically input by the user;
forming the object to be rendered by selecting the projected object in the projection channel according to the visual preference information instantly input by the user; and
forming the rendering object by removing the projected object in the projection channel according to the visual preference information instantly input by the user.

Optionally, the second visual coordinate information may comprise coordinate information of the user relative to the visual platform and user visual direction information.

Optionally, the resolution of each visual plane based on the second visual coordinate information may comprise:
taking the coordinate information of the user relative to the visual platform as a sphere center, and determining the center of a spherical surface where the user is located according to the user visual direction information. Wherein the visual plane is within a range of the spherical surface, in which the center of the spherical surface is rotated clockwise by J1 degrees and rotated counterclockwise by J2 degrees around the sphere center. The center of the spherical surface is set as a focal area; the visual plane within the range of the spherical surface, in which the center of the range of the spherical surface is rotated clockwise by J3 degrees and rotated counterclockwise by J4 degrees around the sphere center, is set as a visual inducted area, and the rest of the visual plane is set as a blind area; and
setting the resolution of the focal area to a, the resolution of the visual inducted area to b, and the resolution of the blind area to c, wherein J1<J3, J2<J4, and a>b>c.

Optionally, J1=J3, values 50-70; and J2=J4, values 90-110.

Optionally, rendering the pipeline based on the projected object in the projection channel and reading the projection result may comprise:
performing primitive assembly based on the projected object in the projection channel to generate the object to be rendered; and
generating the rendering result according to the resolution of the corresponding visual plane of each projection channel.

In order to solve the above technical problem, the technical solution of the present invention provides a multi-window smart content rendering and optimizing method based on the CAVE system, the CAVE system comprises: a data host and a projection array, wherein the projection array includes a plurality of projection devices, comprises:
generating the rendering result based on the multi-window smart content rendering and optimizing method according to the above;
transmitting the rendering result to the projection device by the data host; and
generating a projection image to the corresponding visual plane by the projection device.

The beneficial effects of the technical solution of the present invention at least include:

The technical solution of the present invention realizes the selection of all the scenes that need to be rendered in the CAVE system according to the user preference information so as to provide the users with personalized scene rendering. Moreover, in the preferred example of the technical solution of the present invention, the system visual plane is classified according to the user's field of view to provide different resolutions of different visual planes for rendering, thereby saving resources of computer data processing and improving processing speed. When facing large-scale and complex scenes, the technical solution of the present invention selects the user-preferred objects and improves the users' continuity of observation to a certain extent. There are occlusions between the scene contents when complex scenes are displayed, the user needs to distinguish in observation. Via the preference rendering and the resolution real-time adjustment rendering of the technical solution of the present invention, the system can display the rendering images which the user requires according to the user's visual coordinate information, thereby saving a great deal of manpower, material resources and equipment resources, in the meantime improving user experience.

In a preferred example of the technical solution of the present invention, the displayed resolution of the visual plane can be set according to the user's view. During the observation, the observation parameters can be changed at any time, and the rendering image can be changed in real time, thereby providing the users with high-resolution rendering results as they demand.

In a preferred example of the technical solution of the present invention, the user's view is divided into a focal area, a visual inducted area and a blind area according to the view's range, and according to the characteristics of the range of the user's view, the visual plane in the focal area is set to have a high resolution, the visual plane in the visual inducted area is set to have a medium resolution, and the visual plane in the blind area is set to have a low resolution, so as to save the computing resources while not affecting the user experience.

The technical scheme of the present invention can change the resolution level of different visual planes in the system as the user's gaze is oriented, save computing resources without affecting the user experience, and ensure the real-time high resolution of the multi-plane. In the meantime, the visual plane can be set to have different observation parameters and highlight the object that the user needs to observe in complex scenes.

BRIEF DESCRIPTION OF THE DRAWINGS

Other features, purposes and advantages of the present invention will become more apparent upon reading the detailed description of the non-limiting embodiments with reference to the following drawings, in which.

DETAILED DESCRIPTION

In order to show the technical solutions of the present invention more clearly, the present invention will be further described with reference to the accompanying drawings.

Figure 1:
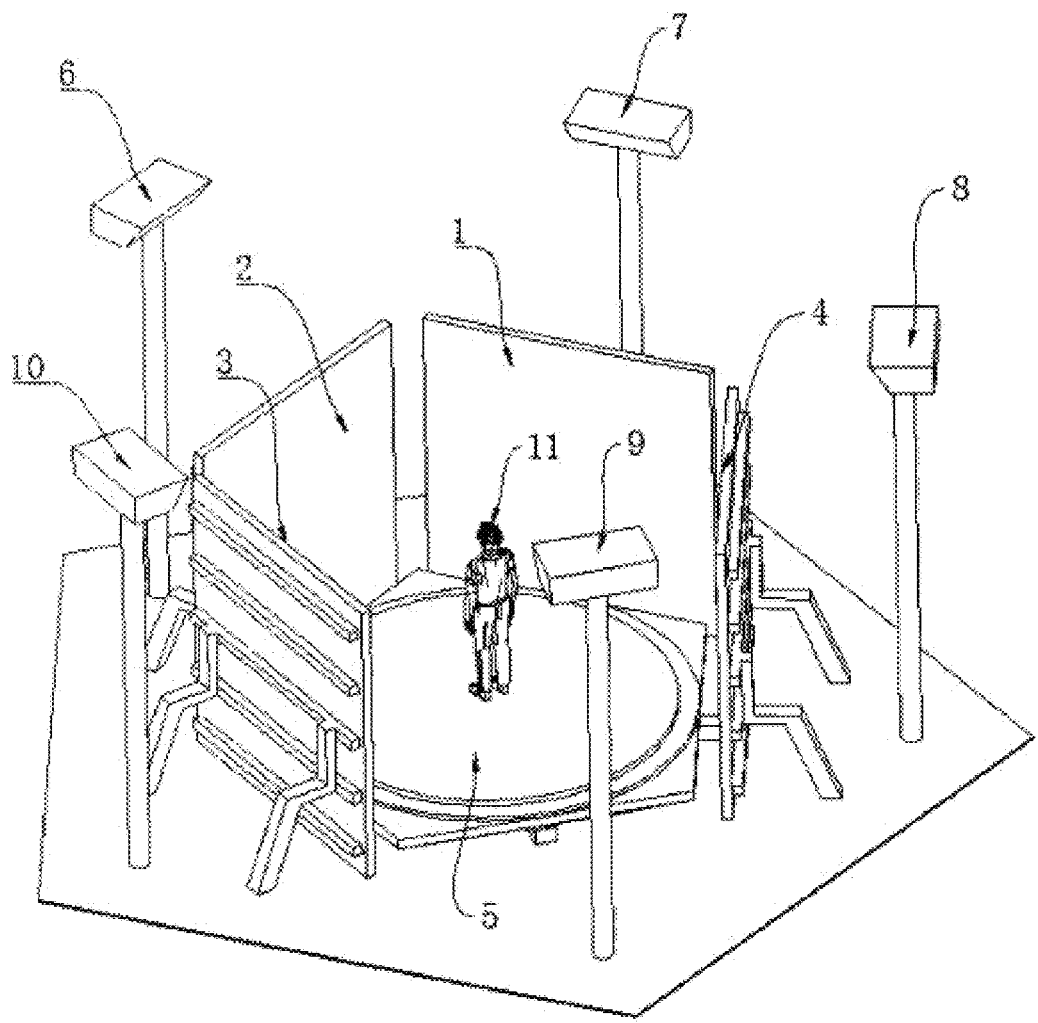
FIG. 1 is a schematic structural diagram of a CAVE system according to a technical solution of the present invention.

As shown in FIG. 1, a cave automatic virtual environment (CAVE) system comprises a projection array and a visual platform, wherein the projection array comprises a plurality of projectors 6-10, the visual platform comprises a plurality of visual planes 1-5 and the visual plane is a projection screen. In one example of the CAVE system, the projection array comprises five projectors, five projectors are arranged in a pentagonal arrangement, and the visual plane comprises four lateral visual projection screens 1-4 and a bottom visual projection screen 5. Images of the five projectors are respectively projected onto five planes of the visual plane, the five projectors are respectively connected with a data host to form a projected image, and a user 11 stands on the bottom visual projection screen 5 in use. The user's line of sight is generally only for lateral visual projection screen 1-4 in the present invention. Certainly, the positions and the numbers of the above-mentioned visual planes and projectors may be arbitrary. The present invention does not limit the positions and the numbers of the above-mentioned visual planes and projectors.

In the prior art, the user cannot personalize the observations based on the CAVE system in the observation process, and the computer renders all the scenes, resulting in the waste of computing resources. The technical solution of the present invention can change the observation parameters in real time according to different observation preferences of the user, distinguish the objects in each screen projection channel according to the label marked before placement, and the corresponding clipping mask is added to the different types of objects. The non-preferred objects are removed before the rendering, and then the objects after the removal are rendered at the resolution level of the corresponding screen to achieve rendering optimization.

Figure 2:
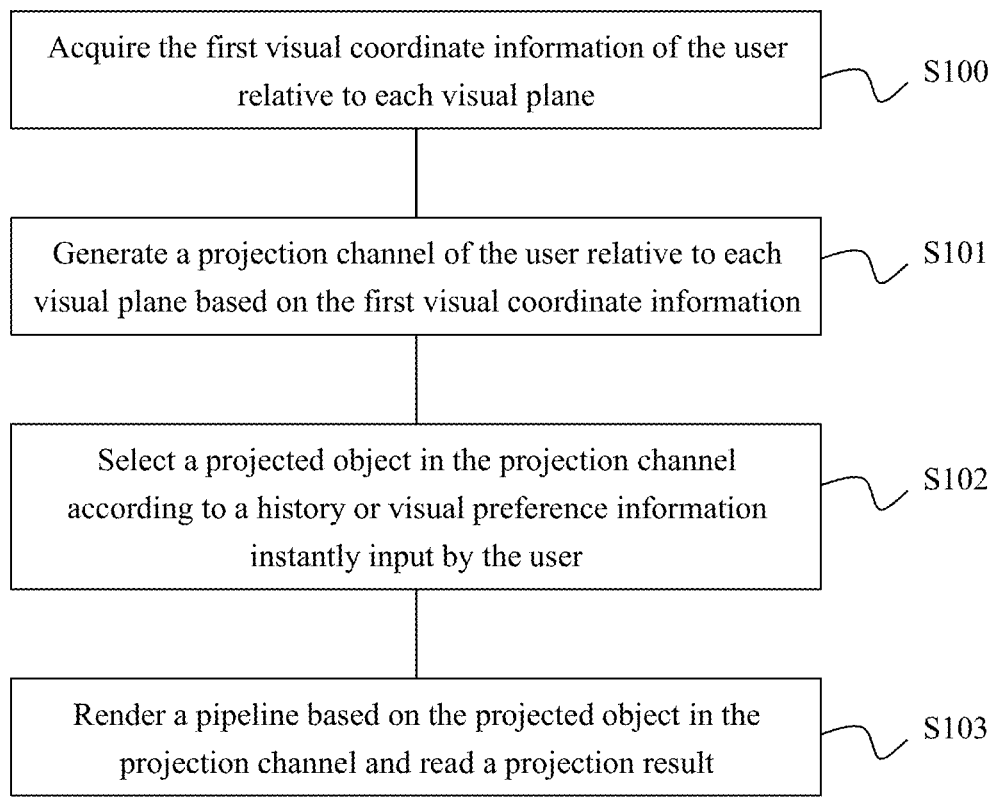
FIG. 2 is a flowchart of a multi-window smart content rendering and optimizing method based on the CAVE system according to the technical solution of the present invention.

Specifically, with reference to FIG. 2, the technical solution of the present invention provides a multi-window smart content rendering and optimization method based on the CAVE system, including the following steps:

Step S100: Acquire first visual coordinate information of the user relative to each visual plane;

Step S101: Generate a projection channel of the user relative to each visual plane based on the first visual coordinate information.

Step S102: Select a projected object in the projection channel according to a history or visual preference information instantly input by the user.

Step S103: Render a pipeline based on the projected object in the projection channel and read a projection result.

According to step S100, the first visual coordinate information includes a near clip distance and a far clip distance from the user's viewpoint to each visual plane. The user viewpoint generally can directly collect the position information of the space where the user's visual platform is located, and the position information can be determined according to the coordinate system set in the CAVE system. The visual plane may include a lateral visual plane screen or a bottom visual plane screen in this embodiment. The near clip distance is the closest plane distance from the user's viewpoint plane to each visual plane, the far clip distance is the farthest plane distance from the user's viewpoint plane to each visual plane, and the user's viewpoint plane is a plane perpendicular to the user's line of sight where the user's viewpoint is located.

According to step S101, in terms of each visual plane, the generated projection channel of each user relative to each visual plane is a projection space generated by the data host on the basis of the position of the user. The projection space is formed by the space of the projection image which is projected by the projector onto the visual plane, and the projection channel defines an image space projected onto the visual plane by the projector. Specifically, during the projection process, the projection channel $S_f$ of the user relative to the visual plane f is obtained based on the following formula:

$$S_f = \begin{pmatrix} \dfrac{2N}{right - left} & 0 & \dfrac{right + left}{right - left} & 0 \\ 0 & \dfrac{2N}{top - bottom} & \dfrac{top + bottom}{top - bottom} & 0 \\ 0 & 0 & -\dfrac{F + N}{F - N} & \dfrac{-2FN}{F - N} \\ 0 & 0 & -1 & 0 \end{pmatrix}$$

Wherein N is the distance from the user's viewpoint to the near clip plane of the visual plane f, F is the distance from the user's viewpoint to the far clip plane of the visual plane f right, left, top and bottom respectively represent the lengths of the four side of the visual plane f, and f is a natural number greater than one.

In this embodiment, the real-time transformation of projection channel can be realized by changing the first visual coordinate information of the user, which is beneficial to the user experience, improves the projection effects, and saves the information processing costs.

According to step S102, the visual preference information comprises projected object markup information, wherein the markup information includes at least one of the following information:

first markup information of an interested projected object; and second markup information of a non-interested projected object.

For the technical solution of the present invention, after the projection channel is set, the user can form historical records of interested projected objects or non-interested projected objects according to their own visual preferences and can also input the interested projected objects or the non-interested projected objects in real time. When the projection channel renders the projected object, the system would mark the projected object in the projection channel. Selecting the projected object in the projection channel according to the history or the visual preference information instantly input by the user includes at least one of the following steps:

forming the object to be rendered by selecting the projected object in the projection channel according to the historical visual preference information input by the user;
forming the rendering object by removing the projected object in the projection channel according to the historical visual preference information input by the user;
forming the object to be rendered by selecting the projected object in the projection channel according to the instant visual preference information input by the user; and
forming the rendering object by removing the projected object in the projection channel according to the instant visual preference information input by the user.

The above-mentioned projected objects are removed or selected based on the cancellation or addition of marks.

According to step S103, rendering the pipeline based on the projected object in the projection channel and reading the projection result comprises:
performing primitive assembly based on the projected object in the projection channel to generate the object to be rendered; and
generating the rendering result according to the resolution of the system and the object to be rendered.

In this embodiment, the projected object for performing primitive assembly is an object marked in the projection channel, and the system resolution is a predetermined projected image resolution of the system.

In an example of this embodiment, the user's preference information is used to determine which object to be projected in the projection channel, and the user can select the observed projected object. For example, as shown in FIG. 1, there are several pieces of furniture placed in the scene, and the user 11 can see the furniture from the front, rear, left and right screens 1-4, but the user would not want to see the furniture from the bottom screen 5, which will affect the observation experience. The user may select to remove the furniture object in the projection channel corresponding to the bottom screen 5 in real time, and the projection channel removes the mark of the furniture object. In an example, the user may also control a part of the system options of viewing the scene, for example, changing the whole proportions of the scene or moving a window to approach an object for observation individually.

Without being limited to the above embodiments, the conventional multi-window rendering method needs to separately render each screen. The screens at the non-center and outside of the field of view occupy a large amount of computing resources, but this does not improve the user's observation experience.

In order to improve the performance of multi-window high-resolution rendering and highlight the user's observation focus, the technical solution of the present invention further provides a rendering method that can do intelligent optimization according to the user's view range based on the above embodiments.

In this embodiment, the technical scheme calculates the user's visual area based on the user coordinate position and the gaze orientation angle and divides 360° horizontal space into three areas according to the horizontal angle. With the sight line direction as the center and with an angle of 50°-70° (preferable 60°) from left and right side to the middle as the focal area where the highest eye visibility is achieved, in which the human eye can focus. The highest resolution image is projected to the visual plane (i.e. the projection screen) to form a stereoscopic vision, which can enhance the visual presence.

With the sight line direction as the center and with a angle of 90°-110° (preferable 100°) from left and right side to the middle as the focal area, where the highest eye visibility is achieved, partly form a visual inducted area where the visibility is relatively low. The second level of resolution is used to make up the field of vision, and meanwhile the screen image transformation is made smooth when the user's view angle is rotating.

The area beyond the above part of the area is the blind area, and the user cannot observe that area. Using the lowest resolution level for the projection screen in that area saves computing resources without affecting user experience.

Specifically, for multiple visual planes in a visual platform, the data host determines the visual range of the user through the incoming user location information and the gaze orientation and divides the screens in the scene respectively into three levels of resolution: the focal area, the visual inducted area (commonly known as split vision), and the blind area, corresponding to three different resolutions a, b, c, of which resolution a>b>c.

The above setting and division of the user's visual field may enable the user to change the observing parameters and the projection resolution corresponding to the location and visual direction of the user at any time during the observation process. The rendered image can be changed in real time to provide the user with high resolution rendering results.

Figure 3:
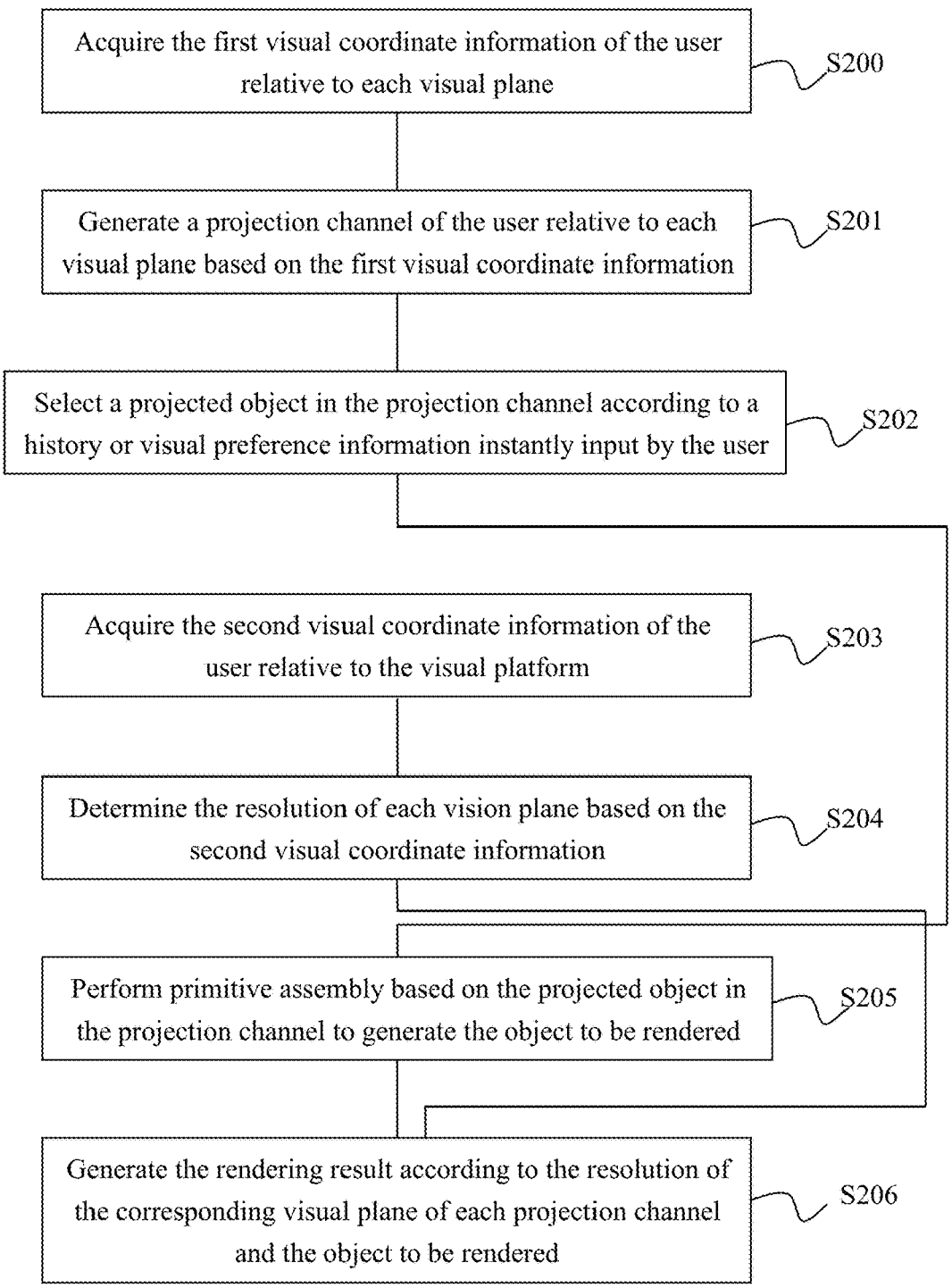
FIG. 3 is another flowchart of the multi-window smart content rendering and optimizing method based on the CAVE system according to the technical solution of the present invention.

Specifically, with reference to FIG. 3, a multi-window smart content rendering and optimizing method based on the CAVE system includes the following steps:
Step S200: Acquire first visual coordinate information of the user relative to each visual plane;
Step S201: Generate a projection channel of the user relative to each visual plane based on the first visual coordinate information.
Step S202: Select the projected object in the projection channel according to the selecting history or the visual preference information instantly input by the user;
Step S203: Acquire second visual coordinate information of the user relative to the visual platform.
Step S204: Determine the resolution of each vision plane based on the second visual coordinate information;
Step S205: Perform primitive assembly based on the projected object in the projection channel to generate the object to be rendered;
Step S206: Generate the rendering result according to the resolution of the corresponding visual plane of each projection channel and the object to be rendered.

In the above steps, there is no relationship that is successively executed between steps S203, S204 and steps S200-S202. For a specific implementation process of steps S200-S202, reference may be made to the foregoing, and details are not described again here.

According to step S203, the second visual coordinate information includes: coordinate information of the user relative to the visual platform and user gaze direction information. The coordinate information of the user relative to the visual platform may refer to the position information of the user's viewpoint, that is, the position information of the space where the user's visual platform is located is directly collected. The position information may be determined according to the coordinate system set in the CAVE system. The user's gaze direction information may be a vector formed by the user's gaze direction starting from the user's viewpoint position.

According to step S204, determining the resolution of each vision plane based on the second visual coordinate information includes the following step.

Figure 4:
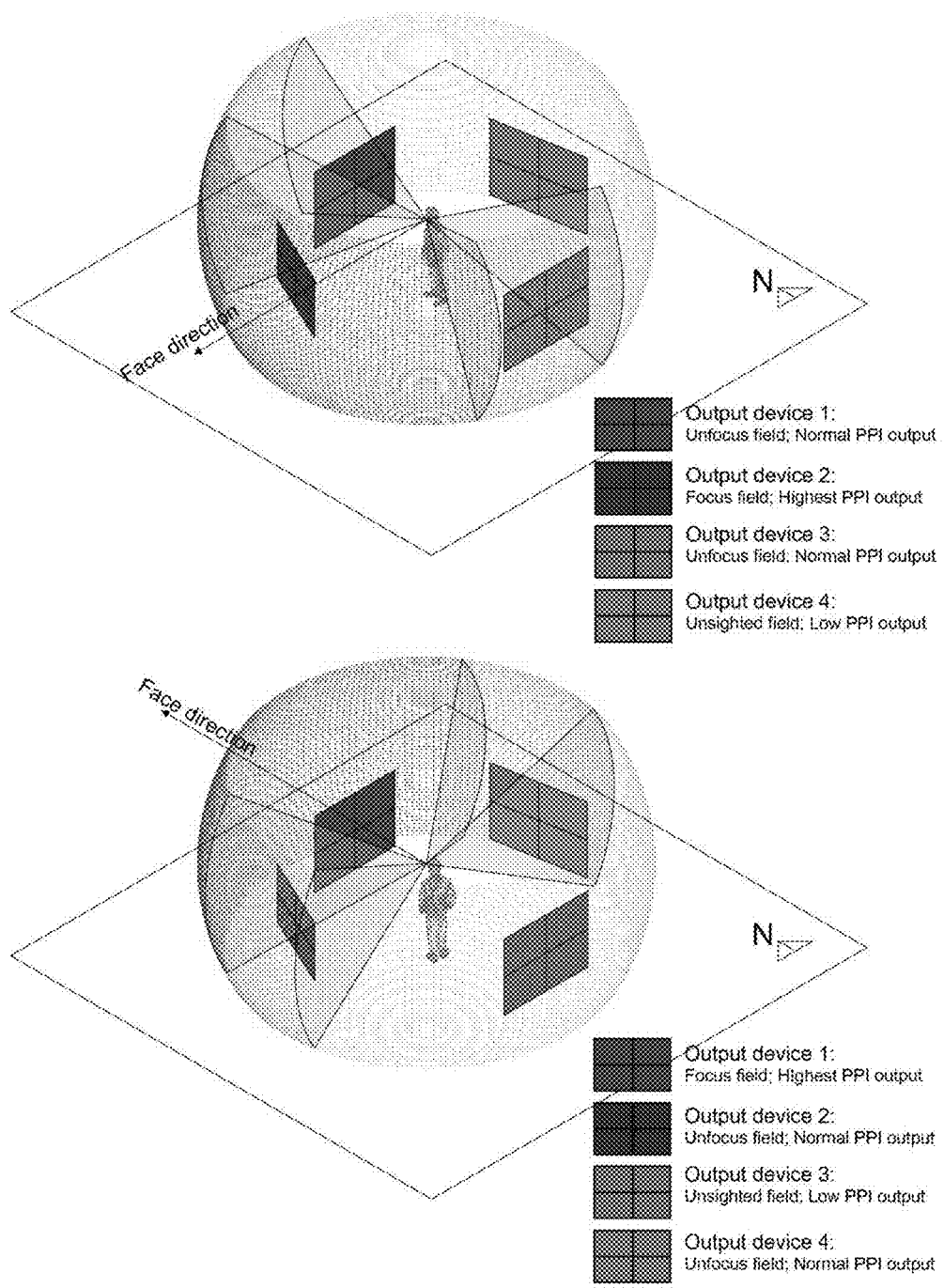
FIG. 4 is the first schematic diagram of determining the resolution of each visual plane based on the second visual coordinate information according to the technical solution of the present invention.

In connection with FIG. 4, taking the coordinate information of the user relative to the visual platform as the center of the sphere, determine the center of the sphere where the user is located according to the user visual direction information. The visual plane within the range of the spherical surface, in which the center of the sphere is rotated clockwise around the sphere center by J1 degrees and rotated counterclockwise by J2 degrees around the sphere center, is set as the focal area. The visual plane within the range of the sphere, in which the center of the sphere is rotated clockwise around the sphere center by J3 degrees and rotated counterclockwise by J4 degrees around the sphere center, is set as the visual inducted area, and the rest of the visual plane is set as the blind area.

Set the resolution of the focal area to a, the resolution of the visual inducted area to b, and the resolution of the blind area to c, wherein J1<J3, J2<J4, a>b>c.

The values of J1, J3, J2, and J4 can be set as required. In a preferred example, J1=J3, value from 50 to 70; J2=J4, value from 90 to 110. More preferably, J1=J3=60, J2=J4=100.

Figure 5:
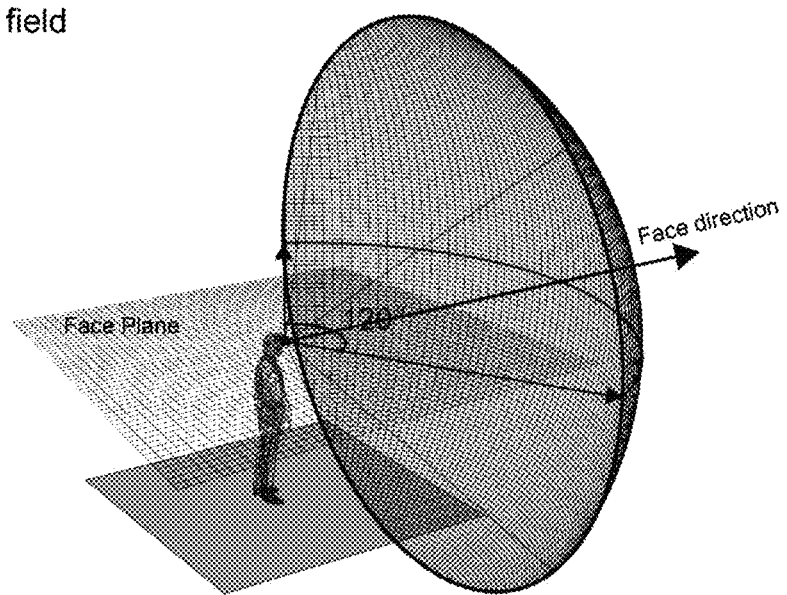
FIG. 5 is the second schematic diagram of determining the resolution of each visual plane based on the second visual coordinate information according to the technical solution of the present invention.
Figure 5:
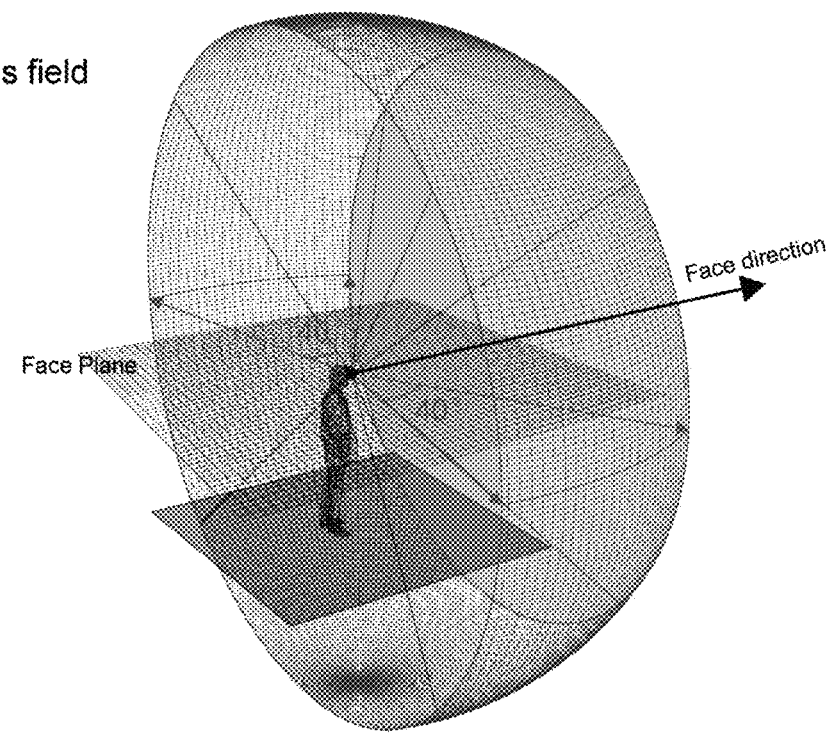
Figure 6:
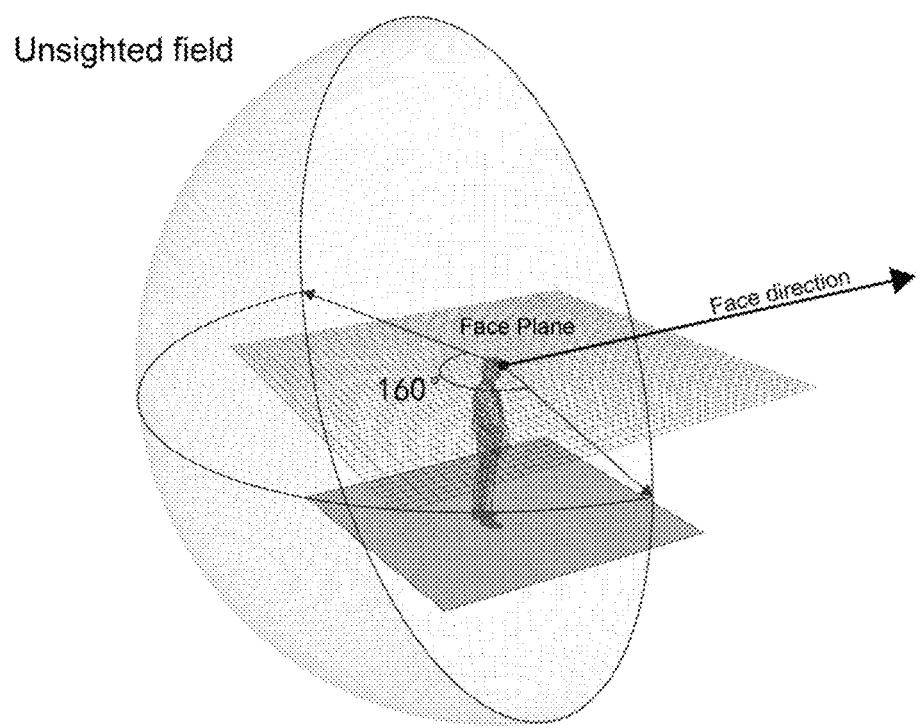
FIG. 6 is the third schematic diagram of determining the resolution of each visual plane based on the second visual coordinate information according to the technical solution of the present invention.
Figure 6:
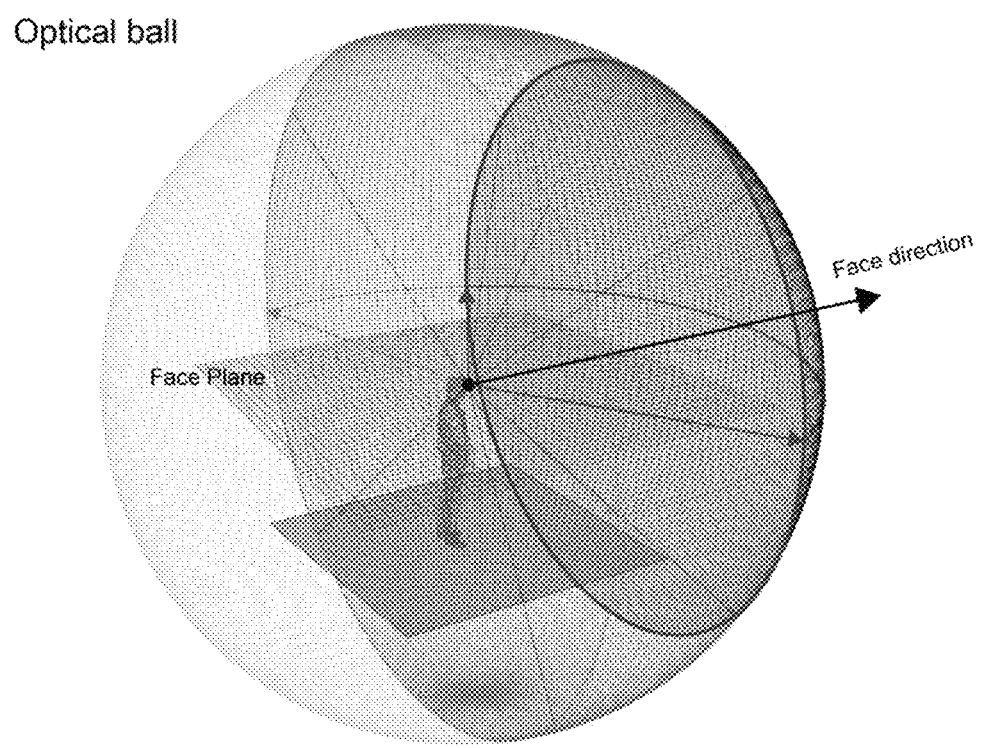

In the case of J1=J3=60 and J2=J4=100, the spatial division of the focus field and the unfocus field is shown in FIG. 5, and FIG. 6 shows the view of the unsighted field and how the optical ball, the sphere center of which is the user coordinate information, is partitioned.

Applied Example

Figure 7:
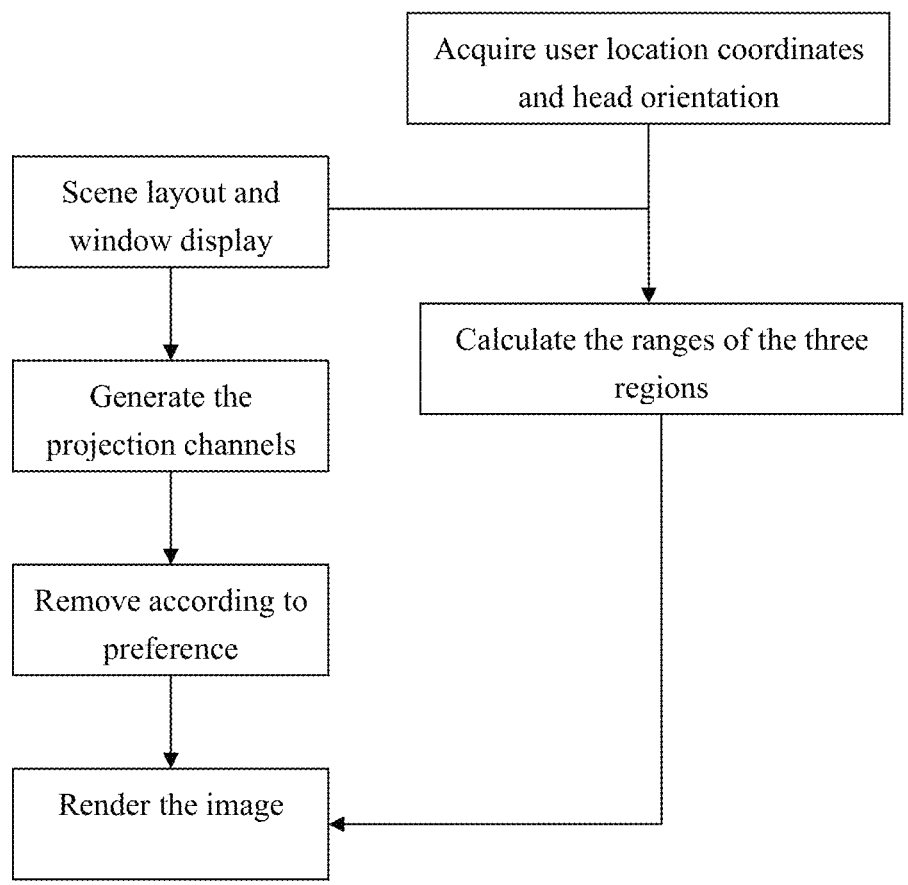
FIG. 7 is a flowchart of an application process of the multi-window smart content rendering and optimizing method based on the CAVE system according to the technical solution of the present invention.

This embodiment provides an application flow of a multi-window smart content rendering and optimizing method based on the CAVE system, which includes the following steps with reference to FIG. 7:
acquiring user location coordinates and head orientation;
calculating the user location coordinates as the sphere center, forming a sphere containing the space where the visual platform is shown, and classifying the sphere view area based on the user's head orientation;
arranging a system scene and laying out a window;
generating projection channels according to the user location coordinates;
removing objects from each projection channel according to user preference settings; and
rendering an image based on the objects in the projection channels.

Specifically, five screens are set and placed in a set-up scenario as required, where objects are divided into two types. The first type of the objects includes walls, ceilings and floors, which are always visible but their texture is changeable; and the second type of the objects is the contents of the scene, such as tables and chairs, sofas and other objects, some of which the user can choose to ignore for observation in some screens by changing the observation parameters.

For each screen, an independent projection channel is generated from the coordinate of the location of each user, and the resolution level of each screen is determined according to the user's gaze orientation. With the gaze orientation as the center, the horizontal angle of the focus field is 120°, the horizontal angle of the unfocus field is 200°, and the rest is the unsighted area.

The resolution of the projection screen at the center of the field of view is set as a, the resolution of the projection screen at the edge of the field of view is set as b, the resolution of the projection screen at the unsighted area is set as c, and the projecting process of the projection channel is established according to the above-mentioned equation of projection channel $S_f$ based on the technical solution of the present invention.

Figure 8:
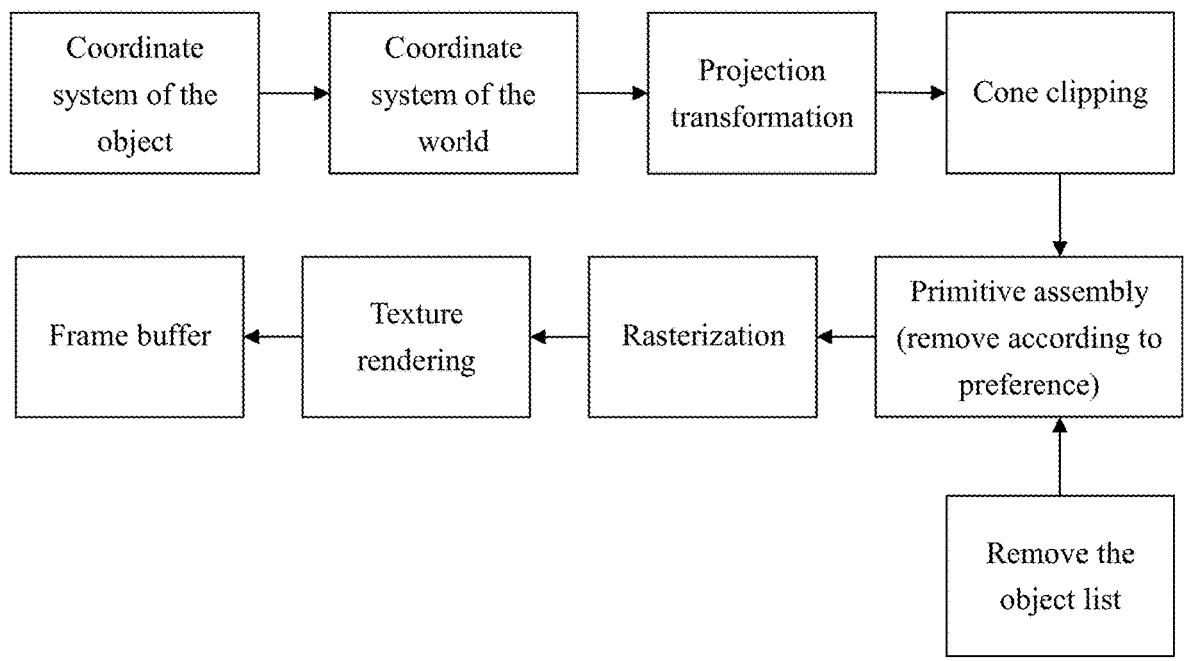
FIG. 8 is a schematic diagram of the pipeline rendering in a rendering process according to the technical solution of the present invention.

Depending on choices that users make, the objects in each projection channel are marked according to the screen preference, the non-observed objects are removed before rendering, and the system uses a list to mark the visible object numbers for each corresponding screen. To improve the efficiency of rendering, the list is used for the primitive assembly phase of graphical pipeline rendering, where the objects marked as invisible in the list will not be assembled into triangles, line segments, and points. This achieves the purpose of removing the invisible objects. The specific pipeline rendering process is shown in FIG. 8.

The content that is remove-processed will be dropped to the corresponding screen based on the screen resolution level. The screen preferences are set dynamically, ensuring the screen rendering content changes in real time.

The screen resolution is changed in real time according to position and sight line movement of the user, therefore saving computing resources without affecting the user experience. Here, we set the screen resolution as follows: five screens are marked as 1-5, wherein the center of the user's sight line is screen 3, the unfocus field is screens 2 and 4, the unsighted area is screen 1, and the ground where the user stands is screen 5. Here in the final stage of rendering, when reading rendering results from the texture, we take out three different resolution images, respectively. The resolutions thereof are a, b, c, respectively, and are set from high to low.

Based on the above contents of the technical solutions of the present invention, this embodiment further provides a multi-window smart content projecting method based on the CAVE system, including the following steps:
generating a rendering result based on the multi-window smart content rendering and optimizing method;
transmitting the rendering result to the projection device by a data host; and
generating a projection image to the corresponding visual plane by the projection device.

The specific embodiments of the present invention have been described above. It should be understood that the present invention is not limited to the specific embodiments described above, various changes and modifications may be made by those skilled in the art, without departing from the spirit and scope of the appended claims.

What is claimed is:

1. A multi-window smart content rendering and optimizing method based on a cave automatic virtual environment (CAVE) system comprising a visual platform comprising a plurality of visual planes, the method comprising:
acquiring first visual coordinate information of a user relative to each visual plane;
generating a projection channel of the user relative to each visual plane based on the first visual coordinate information;
selecting a projected object in the projection channel according to a history or visual preference information instantly input by the user;
rendering a pipeline based on the projected object in the projection channel and reading a projection result;
acquiring second visual coordinate information of the user relative to the visual platform; and
determining the resolution of the each visual plane based on the second visual coordinate information;
wherein rendering the pipeline based on the projected object in the projection channel and reading the projection result comprises:
performing primitive assembly based on the projected object in the projection channel to generate an object to be rendered; and generating a rendering result according to the resolution of the corresponding visual plane of each projection channel and the object to be rendered.

2. The multi-window smart content rendering and optimizing method according to claim 1, wherein the first visual coordinate information comprises a near clip plane distance and a far clip plane distance from the user's viewpoint to each visual plane.

3. The multi-window smart content rendering and optimizing method according to claim 1, wherein the projection channel $S_f$ of the user relative to the visual plane f is obtained based on the following formula:

$$S_f = \begin{pmatrix} \frac{2N}{right-left} & 0 & \frac{right+left}{right-left} & 0 \\ 0 & \frac{2N}{top-bottom} & \frac{top+bottom}{top-bottom} & 0 \\ 0 & 0 & -\frac{F+N}{F-N} & \frac{-2FN}{F-N} \\ 0 & 0 & -1 & 0 \end{pmatrix}$$

wherein N is a distance from the user's viewpoint to a near clip plane of the visual plane f, F is a distance from the user's viewpoint to a far clip plane of the visual plane f, right, left, top and bottom respectively represent lengths of four sides of the visual plane f, and f is a natural number greater than one.

4. The multi-window smart content rendering and optimizing method according to claim 1, wherein the visual preference information comprises projected object markup information, wherein the markup information comprises at least one of the following information:
first markup information of an interested projected object; and
second markup information of a non-interested projected object.

5. The multi-window smart content rendering and optimizing method according to claim 1, wherein selecting the projected object in the projection channel according to the history or the visual preference information instantly input by the user comprises at least one of the following steps:
forming the object to be rendered by selecting the projected object in the projection channel according to the visual preference information historically input by the user;
forming a rendering object by removing the projected object in the projection channel according to the visual preference information historically input by the user;
forming the object to be rendered by selecting the projected object in the projection channel according to the visual preference information instantly input by the user; and
forming the rendering object by removing the projected object in the projection channel according to the visual preference information instantly input by the user.

6. The multi-window smart content rendering and optimizing method of claim 1, wherein the second visual coordinate information comprises coordinate information of the user relative to the visual platform and user visual direction information.

7. The multi-window smart content rendering and optimizing method according to claim 6, wherein the resolution of each visual plane based on the second visual coordinate information comprises:

taking the coordinate information of the user relative to the visual platform as a sphere center, and determining the center of a spherical surface where the user is located according to the user visual direction information, wherein the visual plane within a range of the spherical surface, in which the center of the spherical surface is rotated clockwise by J1 degrees and rotated counterclockwise by J2 degrees around the sphere center, is set as a focal area, the visual plane within the range of the spherical surface, in which the center of the spherical surface is rotated clockwise by J3 degrees and rotated counterclockwise by J4 degrees around the sphere center, is set as a visual inducted area, and the rest of the visual plane is set as a blind area; and
setting a resolution of the focal area to a, a resolution of the visual inducted area to b, and a resolution of the blind area to c, wherein J1<J3, J2<J4, and a>b>c.

8. A multi-window smart content projection method based on a CAVE system, the CAVE system comprising a data host and a projection array, wherein the projection array comprises a plurality of projection devices, the multi-window smart content projection method comprising:
generating a rendering result based on a multi-window smart content rendering and optimizing method comprising,
acquiring first visual coordinate information of a user relative to each visual plane,
generating a projection channel of the user relative to each visual plane based on the first visual coordinate information,
selecting a projected object in the projection channel according to a history or visual preference information instantly input by the user,
rendering a pipeline based on the projected object in the projection channel and reading a projection result,
acquiring second visual coordinate information of the user relative to the visual platform; and
determining the resolution of the each visual plane based on the second visual coordinate information, wherein
rendering the pipeline based on the projected object in the projection channel and reading the projection result comprises:
performing primitive assembly based on the projected object in the projection channel to generate an object to be rendered; and
generating a rendering result according to the resolution of the corresponding visual plane of each projection channel and the object to be rendered;
transmitting the rendering result to the projection device by the data host; and
generating a projection image to the corresponding visual plane by the projection device.

9. The multi-window smart content projection method of claim 8, wherein the first visual coordinate information comprises a near clip plane distance and a far clip plane distance from the user's viewpoint to each visual plane.

10. The multi-window smart content projection method of claim 8, wherein the projection channel $S_f$ of the user relative to the visual plane f is obtained based on the following formula:

$$S_f = \begin{pmatrix} \dfrac{2N}{right-left} & 0 & \dfrac{right+left}{right-left} & 0 \\ 0 & \dfrac{2N}{top-bottom} & \dfrac{top+bottom}{top-bottom} & 0 \\ 0 & 0 & -\dfrac{F+N}{F-N} & \dfrac{-2FN}{F-N} \\ 0 & 0 & -1 & 0 \end{pmatrix}$$

wherein N is a distance from the user's viewpoint to a near clip plane of the visual plane f, F is a distance from the user's viewpoint to a far clip plane of the visual plane f, right, left, top and bottom respectively represent lengths of four sides of the visual plane f, and f is a natural number greater than one.

11. The multi-window smart content projection method of claim 8, wherein the visual preference information comprises projected object markup information, wherein the markup information comprises at least one of the following information:
   first markup information of an interested projected object; and
   second markup information of a non-interested projected object.

12. The multi-window smart content projection method of claim 8, wherein selecting the projected object in the projection channel according to the history or the visual preference information instantly input by the user comprises at least one of the following steps:
   forming the object to be rendered by selecting the projected object in the projection channel according to the visual preference information historically input by the user;
   forming a rendering object by removing the projected object in the projection channel according to the visual preference information historically input by the user;
   forming the object to be rendered by selecting the projected object in the projection channel according to the visual preference information instantly input by the user; and
   forming the rendering object by removing the projected object in the projection channel according to the visual preference information instantly input by the user.

13. The multi-window smart content projection method of claim 8, wherein the second visual coordinate information comprises coordinate information of the user relative to the visual platform and user visual direction information.

* * * * *